March 2, 1971     H. J. MOHLMAN     3,566,472
DENTAL CAVITY FILLING INSTRUMENT
Filed Feb. 27, 1969
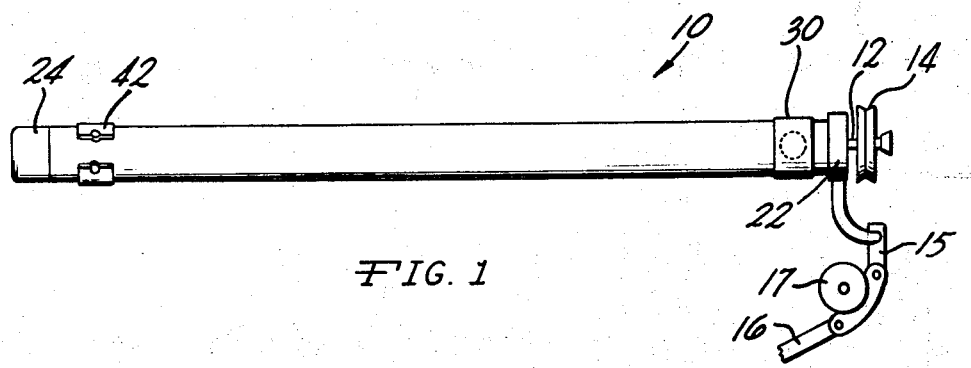
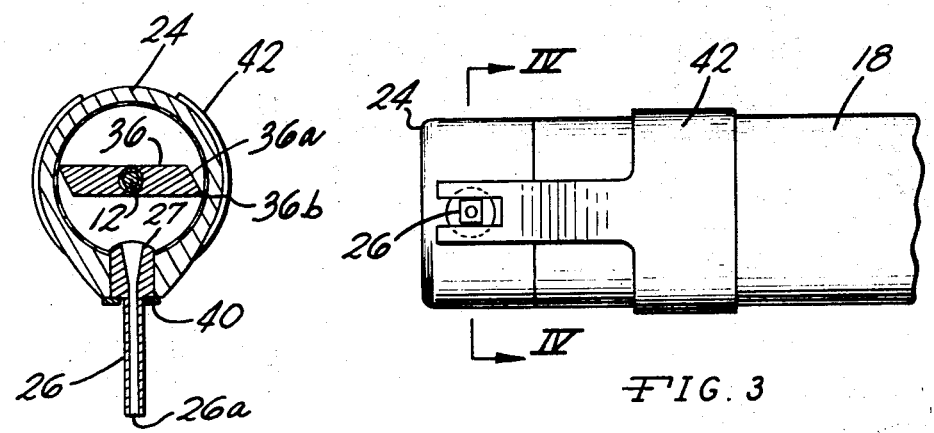
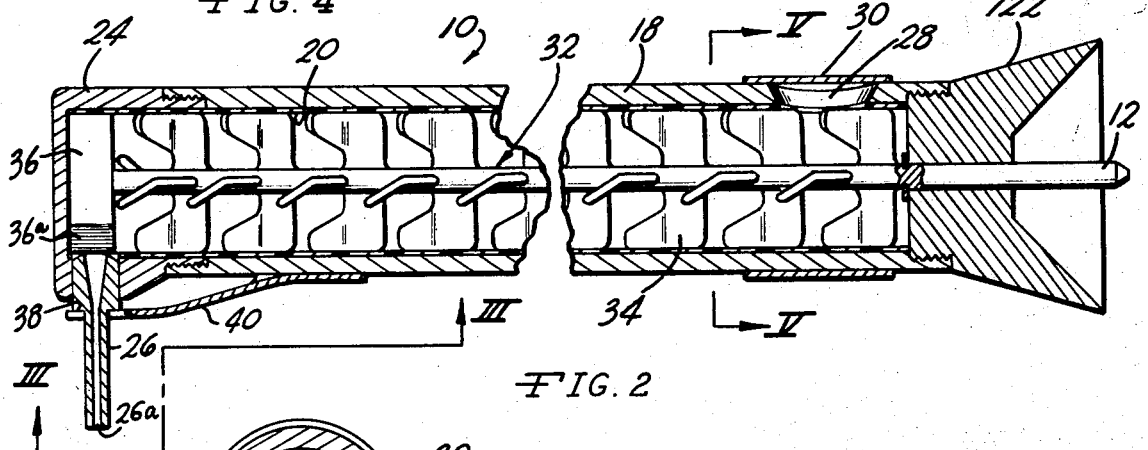
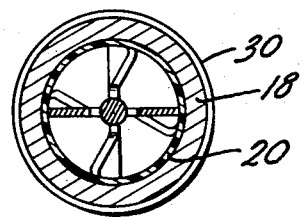
INVENTOR
HAROLD J. MOHLMAN
BY Roy A. Plant
ATTORNEY

United States Patent Office 3,566,472
Patented Mar. 2, 1971

3,566,472
DENTAL CAVITY FILLING INSTRUMENT
Harold J. Mohlman, 163 North Ave.,
Battle Creek, Mich. 49017
Filed Feb. 27, 1969, Ser. No. 802,770
Int. Cl. A61c 5/04
U.S. Cl. 32—60                               4 Claims

ABSTRACT OF THE DISCLOSURE

A device for dental use in the nature of a dentist's handpiece and attachable to the output of a dental power drilling unit, including a tubular body having an inlet near one end for receiving the constituents of dental filling material, an outlet nozzle at the other end for discharging such material, and an internal auger for intermixing the constituents while moving them from the inlet to the outlet and discharging the intermixed material directly into a prepared tooth cavity.

BACKGROUND OF THE INVENTION

As is well known, dental fillings of the type commonly known as "amalgam" or "silver" fillings are made by use of a material compounded from a silver alloy, normally in powder form, and mercury, which have been thoroughly intermixed or triturated into a plastic mass. Conventionally, this mixing or trituration is done by use of a mortar and pestle or, perhaps more commonly, by a mechanical or electrical mixer or vibrator which rapidly agitates and shakes the constituent components to intermix them. Normally, preparation of the amalgam mass is done by a dental assistant under the direction of the dentist, following which the assistant fills a succession of small scoops, each of which is in turn handed to the dentist, who discharges the contents of each succeeding scoop into the prepared cavity. Normally, the dentist uses a tamping instrument, either manual or power-driven, to pack each newly-discharged scoop of amalgam into the confines of the cavity. When the cavity has been filled in this manner, its outer surface is carefully contoured by still another dental tool or tools, so that the filled tooth will have a normal anatomical shape and surface configuration.

The preparation of the amalgam paste in the foregoing manner has long been a part of dental practice and, as is quite evident, it is a time-consuming and tedious process, for which improvements have long been desired but never until now fully or acceptably provided. That is to say, improvements have been suggested in the past, including relatively simple force-fed discharging tools in which a relatively large supply of prepared amalgam paste could be retained and discharged as necessary into a prepared cavity, as well as relatively complex electrical devices which automatically mixed and discharged the amalgam paste into the awaiting cavity. Experience shows that each such proposed improvement has not fully satisfied the dental profession and has not adequately resolved the underlying problems, as is manifested by the conventional practice observed everywhere of dentists resorting to mortar and pestle and mechanized shankers or mixers, followed by the use of the multiplicity of dental tools noted above.

SUMMARY OF THE INVENTION

The present invention provides for the first time a truly satisfactory resolution of the basic problem detailed above, in the form of a new type of dental tool which is superficially much like a conventional handpiece and which is attached for operation to the conventional dental drilling equipment present in every dental office. The new device will automatically combine correct proportions of filling material constituents, thoroughly intermix the constituents into the amalgam paste, automatically discharge the intermixed paste into the prepared tooth cavity, and simultaneously tamp or compact the discharged filling material into the confines of the cavity; furthermore, the depositing nozzle portion of the inventive apparatus, or a quickly-substituted alternate element, may be used as a contouring or carving tool for finishing the filling process. The device of the invention will also carry out individual parts of the foregoing operation separately, and will for example function as a continuous depositor of freshly-prepared filling material, or it will function as a power-driven tamping tool. Thus, the device is flexible and effective in function, since it provides every required operation by means of a single instrument, while at the same time the complexities of previously-suggested automatic mixing and discharging instruments are avoided, inasmuch as the device of the invention is relatively simple and uncomplicated from a structural point of view, is thoroughly dependable and of long operational life with little maintenance, and the presence of electrical current in or near the oral cavity is entirely eliminated, thereby removing a significant source of danger to the patient.

Briefly stated, the device of the invention comprises a somewhat elongated housing or body of the same basic size and shape as a conventional dental handpiece and having a hollow internal passage, with drive means for attachment to the output of a conventional dental drill apparatus, with an inlet at one end of the housing for introducing the constituent elements of dental filling material into the internal passage, with an outlet near the other end of the housing for discharging intermixed filling material, and with a powered auger means at least partially within the internal passage driven by the output from the dental drill and operative to simultaneously intermix the constituents of the filling material while moving the same from the inlet to the outlet of the housing and discharging the mixture from the outlet.

IN THE DRAWINGS

FIG. 1 is an overhead plan view of the device of the invention;

FIG. 2 is an enlarged, fragmentary sectional side elevation of the device, showing an alternate form of attachment means;

FIG. 3 is a fragmentary bottom plan view, as seen from the plane III—III of FIG. 2;

FIG. 4 is a sectional end elevation taken through the plane IV—IV of FIG. 3; and FIG. 5 is a sectional end elevation taken through the plane V—V of FIG. 2.

PREFERRED EMBODIMENT

Referring now in more detail to the drawings, the novel instrument 10 of the invention preferably has the overall shape of a conventional dental handpiece, i.e., basically an elongated cylinder, with an axial shaft 12 protruding from one end, by which it is connected to the power drilling unit. In the embodiment shown in FIG. 1, a pulley wheel or sheave 14 is mounted on shaft 12, for supplying driving rotation to the device through the shaft 12 from a cable or band-type drilling unit. In this configuration, the instrument may also include pivotally joined attachment arms 15 and 16 secured to the body of the instrument adjacent the drive pulley 14 and supporting idler pulleys 17 which guide the drive belt or cable to and from the pulley 14, in a manner generally similar to conventional handpieces used on belt-type power drilling units. Alternatively, as illustrated in FIG. 2, the shaft 12 may merely extend beyond the body of the instrument and not carry a drive pulley, in which configuration the instrument is used with the type of power drilling unit which has a flexible electrical cable with a motor at its end, instead of the belt-type drive means mentioned above. In this event the drive motor attaches to the instrument by a convenional adapter-like straight handpiece which has a chuck for gripping other dental equipment with protruding shafts directly analogous to shaft 12. According to established dental equipment design, this form of the instrument may include an end member forming a concave bell housing which partially encloses the protruding end of the exposed drive shaft, as illustrated.

Regardless of the particular form of its attachment and driving means, the instrument 10 includes a tubular body or housing 18, preferably of stainless steel, which may have an internal sleeve 20 of lubricous plastic or the like, for purposes to be stated subsequently. The body or housing 18 is preferably open at either end, and is internally threaded at such ends to receive an end plug 22 (FIG. 1) or 122 (FIG. 2) and an end cap 24. Of these, either form of the end plug 22 or 122 has an axial opening through which the aforementioned shaft 12 extends outwardly of the instrument, whereas end plug 24 is in the nature of a closed pipe cap, whose internal diameter is coextensive with that of the body 18. End cap 24 has, however, a lateral opening, which serves as an outlet port for the instrument, and into which is slidably fitted a discharge nozzle member 26 (FIGS. 2, 3 and 4). End plug 22 (or 122) has no such lateral opening, but near it the body 18 defines an inlet opening 28 (FIG. 2), extending laterally through the tubular wall of the body and through the sleeve 20. Preferably, a resilient band 30 of metal or plastic is provided as a cover for inlet opening 28, such that this opening can be sealed closed by snapping the band around the circumference of the body, the band having an appropriate split allowing it to be resiliently expanded and slipped over the body.

The silver alloy and the mercury which are to be intermixed to form the amalgam filling material are introduced into the instrument through the inlet opening 28. If desired, the proper amounts of these materials may be manually measured out and inserted into the inlet; however, premeasured pellets or tablets of the silver alloy are now available, and these may simply be inserted with an appropriate amount of mercury into the inlet to afford maximum ease in using the invention. In such an instance the instrument may be relied upon to crush the pellet or, alternatively, the pellet may first be crushed and then inserted. Also, it is to be pointed out that it is within the scope of the invention to provide a continuous, or at least copious, supply of the filling material constituents at the inlet 28, and to introduce predetermined amounts of the constituents upon demand through an appropriate valve or metering means disposed between the inlet and such supply.

Inside the body 18 and its internal sleeve 20 is located an auger means, designated generally by the numeral 32. Preferably, this includes an axial continuation of the shaft 12 noted hereinabove, with a series of axially spaced pairs of blade members 34 attached thereto and extending radially outwardly therefrom. The blade members 34 in each such pair are mounted in mutual alignment on diametrically opposite sides of shaft 12, and each such pair of blades is disposed normal to the pairs of blades on either side. Each blade 34 is somewhat L-shaped in configuration and extends forwardly, or toward the discharge end of the instrument, with respect to the point of its attachment to the shaft. The forwardly-extending portion of each of the blade members is laterally offset, as best seen in FIG. 5, with the offset tip of each blade in a pair of the same extending in opposite circumferential directions. In this manner, the shaft and its succession of spaced pairs of blade members constitute an auger or helix member, which will, in the manner of a worm or screw, move plastic or flowable materials entering the interior of the body 18 through the inlet opening 28 therefor along the length of the body, toward the discharge end thereof; moreover, due to the individually bladed configuration of this auger member, finely-divided or particulate material made up of different constituents will be thoroughly intermixed as it is moved from the inlet to the outlet. Thus, if the constituent elements are mercury and the silver alloy powder conventionally used to make up amalgam-type dental fillings, the different constituents will be thoroughly intermixed into the desired paste or plastic mass by the time the constituents reach the discharge end of the instrument.

At the discharge end of the instrument, inside the end cap 24, the auger means previously mentioned includes an impeller member 36 (FIGS. 2 and 4), which may comprise a polygonal block of material having a pair of tapered or sloping sides 36a terminating at relatively sharply pointed end extremities 36b (FIG. 4). The impeller 36 is secured axially to the shaft 12, to be rotated thereby, such that the pointed end extremities 36b of the impeller sweep the inside diameter of the internal sleeve 20 and pass across the aforementioned discharge opening in which the discharge nozzle 26 is positioned. As may be appreciated, the impeller 36 thus will wipe the triturated mixture brought to the inside of the cap 24 by the series of staggered blade elements 34 from the cap and force the intermixed constituents downwardly through the discharge nozzle 26, which has a longitudinal internal discharge passage 26a, as illustrated (FIGS. 2 and 4).

As illustrated in FIGS. 2 and 4, the discharge nozzle 26 has a rounded upper end extremity 27 which enters the aforementioned discharge opening in the end cap 24. The entire upper portion of the discharge nozzle comprises a cylindrical hub which fits into the discharge opening in the end cap, and beneath this hub the discharge nozzle is of reduced diameter. The point at which the outside diameter of the discharge nozzle changes in size provides a shoulder 38, against which the slotted or bifurcated end of a leaf spring member 40 bears upwardly to retain the discharge nozzle in place. The hub portion of the discharge nozzle is sufficiently long as to position the rounded upper end extremity 27 thereof somewhat inside the body 18 when the spring 40 is limited by direct contact with the bottom extremity of the end cap 24 (note FIG. 4). This inward protrusion of the rounded end 27 of the discharge nozzle is such that as the ramplike angled ends 36a of the impeller 36 sweep across the top of the discharge nozzle, they act as cam surfaces to force the nozzle downwardly, projecting it suddenly outwardly with respect to the body 18. Between the times when the impeller end portions are camming the discharge nozzle outwardly of the instrument, the leaf spring 40, which may comprise a tonguelike lateral projection from an encircling split band 42, will act on shoulder 38 to force the discharge nozzle back up into place within the interior of the body 18. Consequently, as the intermixed amalgam filling material is ejected outwardly of the nozzle 26, the nozzle simultaneously is oscillated or reciprocated laterally with respect to the housing 18. In this respect, it is to be noted that in the broader aspects of the invention, the impeller 36 need not have precisely the same configuration as that illustrated, and may if desired have a different number of camlike blade extremities, so that the frequency of reciprocation of the nozzle may be greater (or less) than that occurring with the two blades illustrated.

The characteristic operation of the discharge nozzle 26 just described provides a dual function for this element. As stated, the discharge nozzle has a central passage 26a through which the filling material is forced out of the instrument and directly into the cavity in the tooth. The outer configuration of the discharge nozzle is preferably sufficiently small in diameter as to enable this member to act as a compactor or tamping tool, which will automatically tamp the filling material deposited in the cavity as such material is being deposited. The value of such an arrangement should be immediately apparent. The need for repeatedly exchanging scoops of prepared filling material with a dental assistant is entirely obviated by the basic function of the present device; moreover, the need for interrupting the filling process to take up special compacting tools is also obviated, inasmuch as the process can be carried on simultaneously. Furthermore, the discharge nozzle is easily disengaged from the instrument itself, since all that is required is to either slide member 40 and its split band 42 out of engagement with tubular member 26 and its enlarged end portion, or manually spring the member 40 resiliently outwardly of the housing, to the point where the end 27 of the nozzle clears the end cap 24. Thus, a wide variety of different tips may be used in place of the particular discharge nozzle illustrated, including discharge nozzles with other specific configurations and sizes, and also including more sharply edged contouring members by which the dentist can shape the top of the deposited filling material in order to give the filled tooth the desired natural or anatomical shape.

The lubricous plastic internal sleeve 20 mentioned previously provides a definite advantage where the body or housing 18 of the instrument is of stainless steel or the like, in conformance with customary dental tool construction, in that the amalgam filling material tends to adhere to such metal and, if allowed to set up inside the housing without a plastic or other such internal sleeve, the amalgam would provide troublesome cleaning difficulties. With such a sleeve, even hardened amalgam will provide no such difficulties, since there will be no adhesion of the amalgam to the sleeve, and the hardened deposits may simply be dumped from the interior of the body with no more than a light tapping thereof required to free the deposits. In this connection, it is to be noted that the construction of the instrument greatly facilitates cleaning, since the body may merely be unscrewed from the end plug 22 (or 122) and retracted therefrom, leaving the auger means attached to the plug and exposed, with the hollow interior of the body fully accessible. Of course if desired the end cap 24 may also be removed quickly and easily, so that both ends of the body are open, for ultimate ease in cleaning the interior thereof. At the same time, the auger means is also fully exposed for easy cleaning, and in this connection it is to be noted that it is within the scope of the invention to provide the auger means in the form of a metal structure coated with an appropriate lubricous plastic such as the polymer presently in wide usage under the trademark "Delrin," so that the auger may be cleaned in the simplest possible way, with no adherence between the amalgam and it.

It is entirely conceivable that those skilled in the art may well devise certain variations and modifications of the preferred embodiments disclosed and described hereinabove. Consequently, the specific structures which are illustrated and described should be regarded as being for purposes of illustration, and not as determininative of the only practical or desirable way of implementing the concept on which this invention is based.

I therefore particularly point out and distinctly claim as my invention:

1. A dental cavity-filling instrument, comprising: an elongated housing having a hollow internal passage; means defining an inlet for introduction of dental filling material into said passage; means defining an outlet spaced from said inlet, for discharging filling material; means contained within said passage for intermixing said filling material and moving the same from said inlet to said outlet, and for discharging the intermixed material from said outlet comprising a shaft rotatively mounted within said passage, a plurality of individual axially spaced blades mounted on said shaft each having at least portion thereof angled with respect to a plane passing through the axis of said shaft, and means for connecting said shaft to a power source; said means defining said outlet comprising a tubular nozzle member having an outer end extremity of such small size and shape as to comprise a tool for inserting said discharge filling material directly into a prepared tooth cavity and for compacting and tamping the filling material discharged into such cavity, and further including means for automatically reciprocating said nozzle member to effect such compaction comprising means mounting said nozzle member for axial reciprocal motion, means biasing said nozzle member axially inwardly and cam means having a cam surface mounted on said shaft and adapted alternately to engage the inner end of said nozzle member and to drive it outwardly, and to release the end of said nozzle member to permit said biasing means to move said nozzle member inwardly, whereby rotation of said shaft causes reciprocal movement of said nozzle means.

2. The device of claim 1, wherein said body portion passage includes a sleevelike liner of lubricous material.

3. A dental cavity-filling instrument according to claim 1, including structure for attaching said shaft to the output of a dentist's drill apparatus.

4. A dental cavity-filling instrument according to claim 1, wherein said cam surface is so contoured that it additionally serves as a pump to force said filling material through said nozzle member.

References Cited

UNITED STATES PATENTS

| | | | |
|---|---|---|---|
| 2,735,735 | 2/1956 | Abel | 128—(Teflon) |
| 3,411,213 | 11/1968 | Spinello | 32—60 |

ROBERT PESHOCK, Primary Examiner